United States Patent Office 3,767,666
Patented Oct. 23, 1973

3,767,666
3-MERCAPTO-1,2,4-TRIAZOL-2-INE-5(THI)ONE CONTAINING THIOPHOSPHATES
James Zielinski, Kenilworth, N.J., assignor to Esso Research and Engineering Company, Linden, N.J.
No Drawing. Filed July 17, 1970, Ser. No. 55,987
Int. Cl. A01n 9/36; C07f 9/16
U.S. Cl. 260—308 C        7 Claims

ABSTRACT OF THE DISCLOSURE

Compounds represented by the following generic formula:

(A)
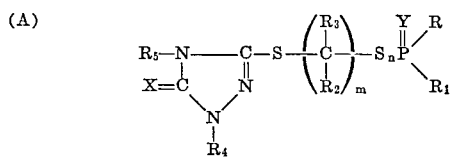

wherein R and $R_1$ can be the same or different and are each selected from the group consisting of $C_1$ to $C_6$ alkoxy, $C_1$ to $C_6$ alkyl, $C_1$ to $C_6$ alkylthio (branched and unbranched), and phenyl optionally substituted by $C_1$ to $C_6$ alkyl, halogen and nitro; $R_2$ and $R_3$ can be the same or different and each is selected from the group consisting of hydrogen, $C_1$ to $C_6$ alkyl (branched or unbranched), $C_1$ to $C_6$ alkylthio, $C_1$ to $C_6$ alkoxy and phenyl optionally substituted by $C_1$ to $C_6$ alkyl, halogen and nitro; $R_4$ and $R_5$ can be the same or different and are each selected from the group consisting of $C_1$ to $C_6$ alkyl (branched or unbranched), phenyl optionally substituted by halogen, nitro or $C_1$ to $C_6$ alkyl, $C_2$ to $C_6$ alkyl thioalkyl, $C_2$ to $C_6$ alkoxyalkyl, $C_1$–$C_6$ mono- and $C_2$–$C_6$ dialkyl or $C_3$–$C_6$ cycloalkyl amino, $C_1$ to $C_6$ alkoxy; $m=0$–4, $n=0$ and 1 subject to the condition that when $m=0$, $n=0$; Y is either O or S and X is either O or S, have been shown to possess insecticidal activity. Compounds represented by the following structural formula:

(B)
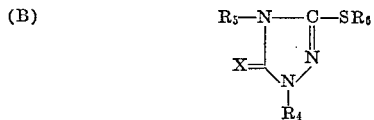

wherein $R_6$ is one selected from the group consisting of H (except when $R_5$ is dimethylamino and X is S) $C_2$ to $C_6$ alkoxyalkyl, $C_1$ to $C_6$ alkyl (branched and unbranched), haloalkyl, phenyl optionally substituted by $C_1$ to $C_6$ alkyl, halogen and nitro, and haloalkyl and $R_4$ and $R_5$ and X are the same as described hereinabove, have been found to possess herbicidal activity as well as being precursors for the synthesis of the compounds described hereinabove.

This invention relates to novel compositions of matter possessing pesticidal activity. In one aspect, this invention relates to thiophosphate analogs of 3-mercapto-1,2,4-triazol-2-ine-5(thi)ones. In another aspect this invention relates to 3-mercapto-1,2,4-triazol-2-ine-5(thi)ones useful as herbicides. In another aspect, this invention relates to employing the thiophosphate derivatives of the 3-mercapto-1,2,4-triazol-2-ine-5(thi)ones as insecticides.

In an article published in Acta Chem. Scandinavica, 22, 309 (1968), the authors U. Anthoni, C. Larsen and P. F. Nielsen, disclose some heterocyclic mercapto derivatives which are close to the precursors of the subject invention. These compounds have one of the following structures:

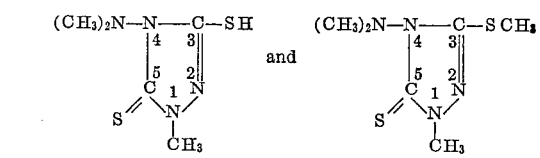

These were the only two compounds synthesized by the Scandinavian workers and differ from some of the precursors of the subject invention in that they contain a dimethylamino group on the (4) position of the ring. In the synthesis of such compounds one must begin with a thiocarbohydrazide precursor such as 1,1,5-trimethyl-thiocarbohydrazide

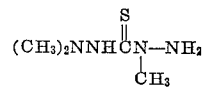

which upon cyclization results in a sulfur atom at the 5 position and a thiol group at position 3 of the ring.

On the other hand, in the subject invention a variety of alkylthio functions in the 3 position of the precursors have been incorporated.

In addition by starting with semicarbazides

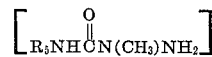

it has been possible to effect the direct alkylation of the 4 position as well as the incorporation of an oxygen atom onto the 5 position giving rise to hitherto unknown and new class of compounds, namely triazole-2-ine-5-ones.

The novel compositions of the subject invention can be characterized as follows:

(A)
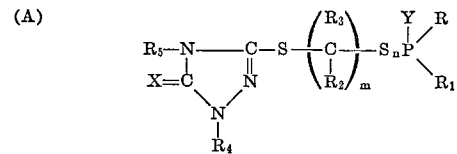

wherein R and $R_1$ can be the same or different and are each selected from the group consisting of $C_1$ to $C_6$ alkoxy, $C_1$ to $C_6$ alkyl, $C_1$ to $C_6$ alkylthio (branched and unbranched), and phenyl optionally substituted by $C_1$ to $C_6$ alkyl, halogen and nitro; $R_2$ and $R_3$ can be the same or different and each is selected from the group consisting of hydrogen, $C_1$ to $C_6$ alkyl (branched or unbranched), $C_1$ to $C_6$ alkylthio, $C_1$ to $C_6$ alkoxy and phenyl optionally substituted by $C_1$ to $C_6$ alkyl, halogen and nitro; $R_4$ and $R_5$ can be the same or different and are each selected from the group consisting of $C_1$ to $C_6$ alkyl (branched or unbranched), phenyl optionally substituted by halogen, nitro or $C_1$ to $C_6$ alkyl, $C_2$ to $C_6$ alkyl thioalkyl, $C_2$ to $C_6$ alkoxyalkyl, $C_1$–$C_6$ mono- and $C_2$–$C_6$ dialkyl or $C_3$–$C_6$ cycloalkyl amino, $C_1$ to $C_6$ alkoxy; $m=0$–4, $n=0$ and 1 subject to the condition that when $m=0$, $n=0$; Y is either O or S and X is either O or S.

Compounds represented by the following structural formula:

(B) 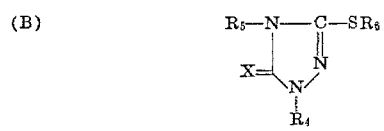

wherein $R_6$ is one selected from the group consisting of H (except when $R_5$ is dimethylamino and X is S) $C_2$ to $C_6$ alkoxyalkyl, $C_1$ to $C_6$ alkyl (branched and unbranched), haloalkyl, phenyl optionally substituted by $C_1$ to $C_6$ alkyl, halogen and nitro, and haloalkyl and $R_4$ and $R_5$ and X are the same as described hereinabove.

Exemplary of compounds which are encompassed by Structural Formula A are the following:
Compound No.
1 O,O-Diethyl-S-[(1,4-dimethyl-5-thiono-triazolin-2-yl)-3-thiomethyl] phosphorothioate
2 O,O-Diethyl-S-[(1,4-dimethyl-5-oxo-triazolin-2-yl)-3-thiomethyl] phosphorothioate
3 O,O-Diethyl-S-[(4-dimethylamino-1-methyl-5-thiono-triazolin-2-yl)-3-thiomethyl] phosphorothioate
4 O-Ethyl-S-n-propyl-S'-[(4-dimethylamino-1-methyl-5-thiono-triazolin-2-yl)-3-thiomethyl] phosphorodithioate
5 O,O-Diethyl-S-[3-(4-dimethylamino-1-methyl-5-thiono-triazolin-2-yl)] phosphorothioate Exemplary of compounds which are encompassed by Structural Formula B are the following:
6 1-methyl-3-chloromethylmercapto-4-dimethylamino-1,2,4-triazol-2-ine-5-thione
7 1-methyl-3-ethylmercapto-4-dimethylamino-1,2,4-triazol-2-ine-5-thione
8 1-methyl-3-isopropylmercapto-4-dimethylamino-1,2,4-triazol-2-ine-5-thione
9 1,4-dimethyl-3-mercapto-1,2,4-triazol-2-ine-5-one
10 1,4-dimethyl-3-mercapto-1,2,4-triazol-2-ine-5-thione
11 1,4-dimethyl-3-isopropylmercapto-1,2,4-triazol-2-ine-5-thione
12 1-methyl-3-mercapto-4-phenyl-1,2,4-triazol-2-ine-5-one
13 1-methyl-3-mercapto-4-phenyl-1,2,4-triazol-2-ine-5-thione
14 1-methyl-3-methylmercapto-4-phenyl-1,2,4-triazol-2-ine-5-thione
15 1-methyl-3-isopropylmercapto-4-phenyl-1,2,4-triazol-2-ine-5-thione
16 1-methyl-3-methylmercapto-4-phenyl-1,2,4-triazol-2-ine-5-one
17 1,4-dimethyl-3-ethylmercapto-1,2,4-triazol-2-ine-5-thione The foregoing compounds can be readily prepared by the following method.

The cyclization of the precursor hydrazide (A) is carried out as described in the previously cited reference according to the following scheme.

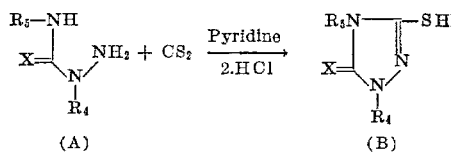

Compound B where X=O and $R_5$ equals groups other than dimethylamino have never been reported as previously mentioned but nevertheless cyclization of (4) to (B) can still be effected according to the previously cited reference. Compounds represented by (A) are well known in the literature and can be prepared by a variety of methods.

A suitable method is described in K. A. Jensen, U. Anthoni, B. Kagi, C. Larsen and C. T. Pederson, Acta Chem. Scand. 22, 1 (1968).

Three methods are used for the synthesis of the phosphates.

Method I

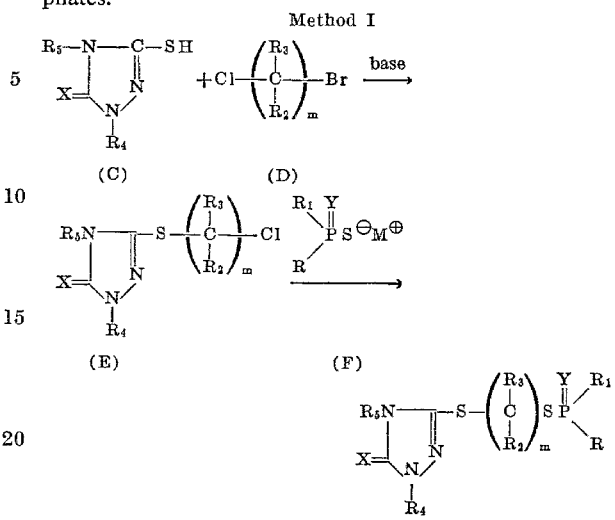

| Mole ratio | Pressure, atm. | Temperature range, °C. | Solvent |
|---|---|---|---|
| (C) plus (D): | | | |
| Broad, 1:20 | 1-10 | 0-100 | Ethanol, methanol, isopropanol. |
| Preferred, 1:8. | 1 | 20-35 | |
| (E) plus (F): | | | |
| Broad, 1:4 | 1-10 | 0-250 | Acetonitrile, methanol, benzene. |
| Preferred, 1:1.2. | 1 | 25-100 | |

The base is one selected from the group consisting of trialkylamines, sodium hydroxide and potassium hydroxide.

Method II

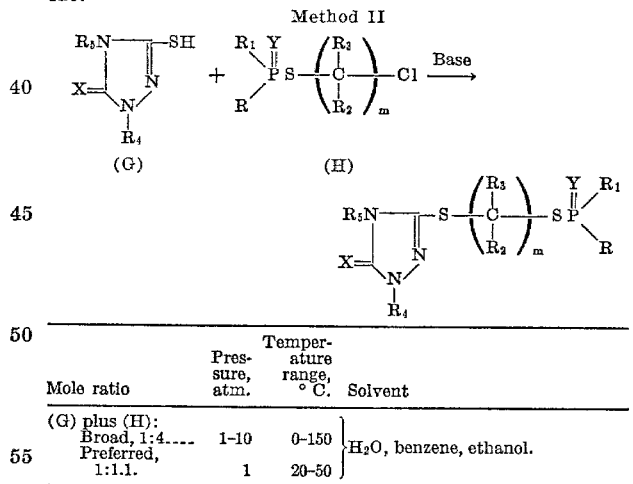

| Mole ratio | Pressure, atm. | Temperature range, °C. | Solvent |
|---|---|---|---|
| (G) plus (H): | | | |
| Broad, 1:4 | 1-10 | 0-150 | $H_2O$, benzene, ethanol. |
| Preferred, 1:1.1. | 1 | 20-50 | |

The base is one selected from the group consisting of trialkylamines, sodium hydroxide and potassium hydroxide.

Method III

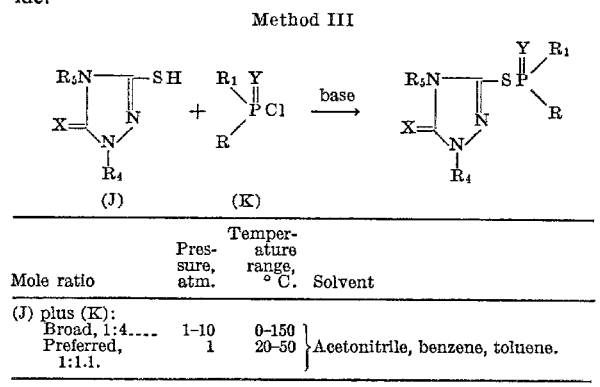

| Mole ratio | Pressure, atm. | Temperature range, °C. | Solvent |
|---|---|---|---|
| (J) plus (K): | | | |
| Broad, 1:4 | 1-10 | 0-150 | Acetonitrile, benzene, toluene. |
| Preferred, 1:1.1. | 1 | 20-50 | |

The base is one selected from the group consisting of trialkylamines, sodium hydride and sodium hydroxide.

The following method is utilized for the synthesis of the non-phosphate analogs.

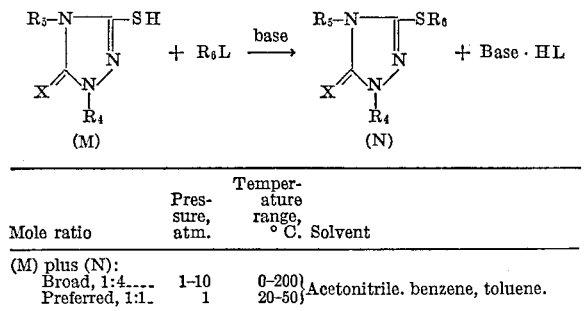

| Mole ratio | Pressure, atm. | Temperature range, °C. | Solvent |
|---|---|---|---|
| (M) plus (N): | | | |
| Broad, 1:4 | 1-10 | 0-200 | Acetonitrile, benzene, toluene. |
| Preferred, 1:1 | 1 | 20-50 | |

L is one selected from the group consisting of chlorine, iodine and bromine.

The base employed in this reaction is one selected from the group consisting of trialkylamines, sodium hydroxide and potassium hydroxide.

The compounds of the invention have general insecticidal properties. However, the novel precursors have been also found to possess herbicidal activity. Both herbicidal and insecticidal compositions of the invention are prepared by admixing one or more of the active ingredients defined heretofore in either herbicidally or insecticidally effective amounts for the conditioning agent of the kind used and referred to in the art as the pest control adjuvant or modifier to provide formulations adapted for ready and efficient application to soil or weeds (i.e. unwanted plants) using conventional applicator equipment in the case of the herbicidal use. The insecticidal compositions are applied to the insects either by direct contact or systemically.

Thus, the herbicidal or insecticidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50% by weight or more concentration of the active ingredient can be obtained in solution.

The herbicidal or insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene-carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The herbicidal or insecticidal compositions are applied either as a spray, granular or a dust to the locus or area to be protected from undesirable plant growth, commonly called weeds, i.e. plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired herbicidal or insecticidal action. The amount of the active compound present in the compositions as actually applied for destroying or preventing weeds will vary with the manner of application, the particular weeds for which control is sought, the purpose for which the application is being made, and like variables. In general, the herbicidal or insecticidal compositions as applied in the form of a spray, dust or granular, will contain from about 0.1% to 100% by weight of the active compound.

Fertilizer materials, other herbicidal or insecticidal agents, and other pest control agents such as fungicides can be included in the herbicidal or insecticidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the present compounds.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case, a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e. deflocculating or suspending agent, and if desired, a finely divided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitols, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

WORKING EXAMPLES

The precursor compounds (Formula B) are prepared according to the method described in the Scandinavian reference referred to hereinabove. The novel precursors are shown below.

Example 1.—Preparation of 1,4-dimethyl-3-mercapto-1,2,4-triazol-2-ine-5-one 2,4-dimethylsemicarbazide (72.1 g., 0.7 mol) and carbon disulfide (91 g., 1.2 mols) were added to 600 ml. pyridine and heated at 93–96° for 4 hrs., cooled and allowed to stir at room temperature overnight. The pyridine was removed in vacuo and the yellow solids dissolved in water and washed with ether. Sulfuric acid is then added to the aqueous solution to precipitate Cpd. 9 as a crude solid which after drying weighed 85.1 g. (84%). Recrystallization from hot ethanol gave white needles, M.P. 203–207°. The structure was confirmed by NMR.

Analysis.—Calcd. for $C_4H_7N_3OS$ (percent): C, 33.1; H, 4.83; N, 28.9; S, 22.1. Found (percent): C, 33.07; H, 5.00; N, 29.00; S, 22.70.

Example 2.—Preparation of 1,4-dimethyl-3-mercapto-1,2,4-triazol-2-ine-5-thione 2,4-dimethylthiosemicarbazide (95.2 g., 0.8 mol), carbon disulfide (100 g., 1.4 mol) and 600 ml. of pyridine were combined and heated at 100° for 3 hrs. After addition of 25 additional ml. of pyridine heating was carried out for 2 more hrs. The pyridine was removed in vacuo, with the addition of toluene to remove traces of pyridine. Water was added to the solid and the undissolved solids (disulfide) removed by filtration. The $H_2O$ layer was washed three times with ether and the product precipitated with conc HCl. Crystallization from hot ethanol gave 88.3 g. (68%) of the title compound, M.P. 124.5–127° C. The structure was confirmed by NMR.

Analysis.—Calcd. for $C_4H_7N_3S_2$ (percent): C, 29.8; H, 4.35; N, 26.1; S, 39.6. Found (percent): C, 29.63; H, 4.20; N, 25.39; S, 39.92.

Example 3.—Preparation of 1-methyl-3-mercapto-4-phenyl-1,2,4-triazol-2-ine-5-one This compound is prepared by the same method used for Example 1. 2-methyl-4-phenylsemicarbazide was heated with pyridine and carbon disulfide to give the compound of this example in a yield of 6%, M.P. 228–229°.

Analysis.—Calcd. for $C_9H_9N_3OS$ (percent): C, 52.3; H, 4.34; N, 20.3; S, 15.4. Found (percent): C, 51.89; H, 4.54; N, 21.11; S. 15.47.

Example 4.—Preparation of 1-methyl-3-mercapto-4-phenyl-1,2,4-triazol-2-ine-5-thione This compound is prepared by the same method used for Example 2. 2-methyl-4-phenylthiosemicarbazide was heated with pyridine and carbon disulfide to give the compound of this example in a yield of 88%, M.P. 151–154°.

Example 5.—Preparation of 1-methyl-3-chloromethyl-mercapto-4-dimethylamino-1,2,4-triazol-2-ine-5-thione 1-methyl-3-mercapto-4-dimethylamino - 1,2,4 - triazol-2-ine-5-thione (19 g., 0.1 mol) was added to a solution of sodium hydroxide (4 g., 0.1 mol) in 100 ml. methanol. Bromochloromethane (104 g., 0.8 mol) was added to this solution in one portion and the mixture allowed to stir for 24 hrs. The sodium bromide was removed by filtration and the methanol removed in vacuo to give 21 g. (88%) of the product as a white solid. Recrystallization from water-ethanol gave a white crystalline material, M.P. 92–94° C.

Analysis.—Calcd. for $C_6H_{11}N_4S_2Cl$ (percent): C, 30.3; H, 4.62; N, 23.4; S, 26.7. Found (percent): C, 30.35; H, 4.82; N, 22.32; S, 26.51.

Example 6.—Preparation of 1-methyl-3-isopropylmercapto-4-dimethylamino-1,2,4-triazol-2-ine-5-thione Triethylamine (5.1 g., 0.05 mol) was added rapidly to a solution of 1-methyl-3-mercapto-4-dimethylamino-1,2,4-triazol-2-ine-5-thione (9.5 g., 0.05 mol) in 100 ml. acetonitrile. To this was added rapidly a solution of 2-iodopropane (8.5 g., 0.05 mol) in 50 ml. acetonitrile and the mixture allowed to stir overnight. The solvent was removed in vacuo and the solid washed with water. This solid was recrystallized from methanol to give 7.5 g. (64.7%) of the compound as white needles, M.P. 93–94°. The structure was confirmed by NMR.

Analysis.—Calcd. for $C_8H_{16}N_4S_2$ (percent): C, 41.3; H, 6.90; N, 24.1; S, 27.1. Found (percent): C, 40.66; H, 6.90; N, 24.00; S, 27.65.

Example 7.—Preparation of 1,4-dimethyl-3-isopropyl-mercapto-1,2,4-triazol-2-ine-5-thione This compound is prepared using the method described for Example 6. The product of Example 2 is reacted with isopropyl iodide to give the product, yield 45%, M.P. 45–46°.

Analysis.—Calcd. for $C_7H_{13}N_3S_2$ (percent): C, 41.3; H, 6.41; N, 20.7; S, 31.5. Found (percent): C, 41.52; H, 6.49; N, 21.11; S, 31.83.

Example 8.—Preparation of 1-methyl-3-methylmercapto-4-phenyl-1,2,4-triazol-2-ine-5-thione This compound is prepared by the method described for Example 6. The product of Example 4 is reacted with methyl iodide to give the product, yield 57%, M.P. 131–136°.

Analysis.—Calcd. for $C_{10}H_{11}N_3S_2$ (percent): C, 50.7; H, 4.63; N, 17.75; S, 27.0. Found (percent): C, 47.96; H, 4.51; N, 17.51; S, 27.92.

Example 9.—Preparation of 1-methyl-3-isopropyl-mercapto-4-phenyl-1,2,4-triazol-2-ine-5-thione This compound is prepared by the method described for Example 6. The product of Example 4 is reacted with isopropyl iodide to give the product, yield 84%, M.P. 92–93.5°.

Analysis.—Calcd. for $C_{12}H_{15}N_3S_2$ (percent): C, 54.4; H, 5.66; N, 15.8, S, 24.2. Found (percent): C, 53.56; H, 5.72; N, 16.17; S, 25.67.

Example 10.—Preparation of 1-methyl-3-methylmercapto-4-phenyl-1,2,4-triazol-2-ine-5-one This compound is prepared by the method described for Example 6. The product of Example 3 is reacted with methyl iodide to give the product, yield 76%, M.P. 133–135°.

Analysis.—Calcd. for $C_{10}H_{11}N_3OS$ (percent): C, 54.3; H, 4.97; N, 19.00; S, 14.47. Found (percent): C, 54.42; H, 5.20; N, 19.43; S, 14.50.

Example 11

In this example representative derivatives of the compounds of this invention were evaluated for post-emergence activity. The test procedure was as follows:

Two flats seeded with six crops (cotton, soybean, alfalfa, corn, rice and oats) and six weeds (mustard, morning-glory, crabgrass, foxtail, barnyard grass and zinnia) were held until the first true leaves had appeared on all plants. The flats were then sprayed with a formulation containing the test chemical at a rate equivalent to 10 lbs./ acre. The test chemicals were sprayed as acetone solution or very small particle acetone suspensions onto the test plants. Sprayers were calibrated to deliver a cetrain volume of liquid and the calculated amount of active ingredient which would give a rate corresponding to the indicated lbs./acre. The plant responses were rated 12–16 days after treatment on a scale of 0–10. The 0–10 scale is defined as: 0=no injury; 1–3=slight injury; 4–6=moderate injury, plants may die; 7–9=severe injury, plants will probably die; 10=all plants dead (complete kill). The test results are shown in Table I.

Example 15.—Preparation of 1-methyl-3[(O-ethyl-S'-n-propylphosphorodithio) - S - methylmercapto] - 4-dimethylamino-1,2,4-triazol-2-ine-thione 1-methyl-3-chloromethylmercapto - 4 - dimethylamino-1,2,4-triazol-2-ine-5-thione (11.9 g., 0.05 mol) and potassium O-ethyl-S'-n-propyl phosphorodithioate (12.1 g., 0.05 mol) were combined in 200 ml. acetonitrile, refluxed 2 hrs., allowed to stir at room temperature and further refluxed for an additional 8 hrs. The KCl was removed by filtration and the solvent removed in vacuo to give an oil which was partitioned between ether and water. At this point a small amount of unidentified solid, 400 mg.,

TABLE I

Post-emergent herbicidal activity of the compounds of this invention having structure B, percent control at 10 lbs./acre

| Compound | Barnyard grass | Crabgrass | Foxtail | Zinnia | Mustard | Morning glory |
|---|---|---|---|---|---|---|
| 1,4-dimethyl-3-mercapto-1,2,4-triazol-2-ine-5-one | 80 | 80 | 100 | 60 | 50 | 40 |
| 1,4-dimethyl-3-mercapto-1,2-4-triazol-2-ine-5-thione | 10 | 20 | 30 | 70 | 90 | 30 |
| 1-methyl-3-mercapto-4-phenyl-1,2,4-triazol-2-ine-5-thione | 30 | 0 | 60 | 90 | 70 | 30 |
| 1,4-dimethyl-3-ethylmercapto-1,2,4-triazol-2-ine-5-thione | 100 | 100 | 90 | 100 | 100 | 80 |

Example 12.—Preparation of 1,4-dimethyl-3[O,O-diethylphosphorothio)-S-methylmercapto]-1,2,4-triazol-2 - ine-5-thione 1,4-dimethyl-3-mercapto-1,2,4-triazo-2-ine 5-thione (8.1 g., 0.05 mol) was dissolved in a solution of sodium hydroxide (2 g., 0.05 mol) in 50 ml. $H_2O$. O,O-diethyl-S-chloromethyl phosphorothio (10.9 g., 0.05 mol) was added dropwise and the mixture allowed to stir at room temperature for 72 hrs. An insoluble oil formed which was separated, dissolved in ether, dried ($MgSO_4$), filtered and evaporated in vacuo to give a yellow oil, 9.6 g. (56%). Thin layer chromatography on silica gel (20% benzene in ethylacetate) showed the presence of one major spot ($R_f=0.3$). NMR confirmed the structure as that of the product.

Example 13.—Preparation of 1,4-dimethyl-3[O,O-diethylphosphorothio)-S-methylmercapto]-1,2,4-triazol-2 - ine-5-one (Compound 2)

1,4-dimethyl-3-mercapto-1,2,4-triazol-2-ine-5 - one (8.7 g., 0.06 mol) was added in one portion to a solution of sodium hydroxide (2.4 g., 0.06 mol) in 50 ml. water and allowed to stir for 2.5 hrs. To this solution was added in one portion O,O-diethyl-S-chloromethyl phosphorothioate (13.1 g., 0.06 mol) and the mixture allowed to stir for 96 hrs., and extracted with chloroform and benzene. The organic layer was dried ($MgSO_4$), filtered and evaporated in vacuo to give 7.7 g. (42%) of ER–9529 as an oil. The structure was confirmed by NMR as Compound 2.

Example 14.—Preparation of 1-methyl-3[(O,O-diethylphosphorothio)-S-methylmercapto] - 4-dimethylamino-1,2,4-triazol-2-ine-5-thione (Compound 3)

1-methyl-3-mercapto-4 - dimethylamino-1,2,4-triazol-2-ine-5-thione (9.5 g., 0.05 mol) was added in one portion to a solution of sodium hydroxide (2.0 g., 0.05 mol) in 100 ml. water and allowed to stir for 3 hrs. To this solution was added in one portion O,O-diethyl-S-chloromethyl phosphorothioate (10.9 g., 0.05 mol) and the mixture allowed to stir over night during which time an oil settled out. Ether was added to the flask to effect solution of the oil. The ether layer was collected and the water layer further extracted with chloroform. After drying ($MgSO_4$) and filtration the ether layer on standing yields 1.3 g. (8%) of the product as a white solid which defied crystallization. Thin layer chromatography on silica gel showed the presence of one compound ($R_f=0.55$; benzene/ethyl acetate, 1:1). The structure was confirmed by NMR to be the product.

appeared and was removed by filtration. The ether layer was dried ($MgSO_4$), filtered and evaporated in vacuo to give the product as an amber oil. Thin layer chromatography of the product on silica gel (10% ethyl acetate in benzene) showed the presence of one major spot, $R_f=0.3$. NMR and IR confirmed the structure as the product.

Analysis.—Calcd. for $C_{11}H_{23}N_4O_2PS_4$ (percent): C, 32.82; H, 5.76; N, 13.92. Found (percent): C, 32.58; H, 5.53; N, 14.95.

Example 16.—Preparation of 1-methyl-3(O,O-diethyl phosphorothio)-4-dimethylamino - 1,2,4-triazol-2-ine-5-thione (Compound 5) and 1-methyl-3-ethylmercapto-4-dimethylamino-1,2,4-triazol-2-ine-5-thione Under a nitrogen atmosphere sodium hydride (5.0 g., 0.11 mol) was added to a mixture of 1-methyl-3-mercapto-4-dimethylamino - 1,2,4-triazol-2-ine-5-thione (19.0 g.; 0.1 mol) in 200 ml. dry benzene. Diethyl chlorophosphate (17.3 g., 0.1 mol) was added dropwise, rapidly and the mixture allowed to stir at room temperature overnight. To the clear yellow solution was added 200 ml. water and the layers separated. The benzene layer was further washed with sodium bicarbonate solution and water and dried ($MgSO_4$), filtered and evaporated in vacuo to give a yellow-white semisolid. This solid was removed by filtration and the filtrate was cooled and more solid removed by filtration. The combined solids were recrystallized from ether to give 4 g. of the product as white needles, M.P. 102.5–104.5°. The structure was confirmed by NMR.

Analysis.—Calcd. for $C_7H_{14}N_4S_2$ (percent): C, 38.15; H, 6.38; N, 25.58; S, 29.3. Found (percent): C, 38.27; H, 6.09; N, 25.57; S, 29.33.

The yellow oil was shown by NMR to be the product, 11.1 g. (34%).

Example 17

These thiophosphate analogs of 3-mercapto-1,2,4-triazol-2-ine-5(thi)ones were tested as aqueous emulsions. These emulsions were prepared by dissolving the compound in acetone and dispersing it in distilled water with Triton X–100, an alkylaryl polyether alcohol derived by the reaction of i-octyl phenol with ethylene oxide, to give spray emulsions containing the desired concentration of the compound. These emulsions were then used in standard laboratory tests described below.

Mexican bean beetle.—Bean leaves were dipped in the emulsion of the test chemical and allowed to dry. The individual treated leaves were placed in Petri dishes and five Mexican bean beetle larvae introduced into each of the two replicate dishes.

Mites, contact.—Potted bean plants infested with the two-spotted spider mites were placed on a turntable and sprayed with a formulation of the test chemical. The plants were held for seven days and the degree of mite control was rated after this period.

Mites, systemic.—Bean plants were treated by applying 20 ml. of the formulated test chemical to the soil. The mites were transferred to the plants after 24 hours. The plants were held for seven more days and the degree of mite control rated.

Aphid, contact.—Potted nasturtium plants infested with the bean aphids were placed on a turntable and sprayed with a formulation of the test chemical. The plants were held for two days and the degree of aphid control was rated.

Aphid, systemic.—Nasturtium plants were treated by applying 20 ml. of the formulated test chemical to the soil. The mites were transferred to the plants after 24 hours. The plants were held for 48 additional hours and the degree of the aphid control rated.

Housefly.—Caged houseflies were sprayed with the formulated test chemical. After 2 days the degree of housefly control was rated.

Boll weevil.—Five mixed sex adult boll weevils placed in a wire screen cage were sprayed with the proper concentration of formulated test chemical. The boll weevils were provided with sucrose solution on a filter paper. The cages were held at about 70° F. for 24 hours and the percent mortality read after 24 hours.

Pea aphid, contact.—Pea plants were sprayed with the proper concentration of the formulated test chemical and then the plants were infested with twenty to thirty adult pea aphids. The plants were held at 70° F. for 24 hours and the degree of pea aphid control was rated.

Pea aphid, systemic.—Pea plants were treated by applying 20 ml. of the formulated test chemical to the soil. The pea aphids were transferred to the plants. The degree of pea aphid control was rated after holding the plants for 48 hours. These results are given in Table II.

What is claimed is:

1. A compound of the formula

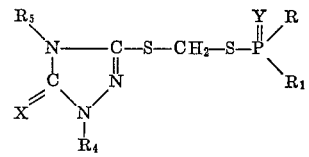

wherein R and $R_1$ can be the same or different and are $C_1$–$C_6$ alkoxy or $C_1$–$C_6$ alkylthio; $R_4$ is $C_1$–$C_6$ alkyl; $R_5$ is $C_1$–$C_6$ alkyl or dimethylamino; X is oxygen or sulfur; and Y is oxygen or sulfur.

2. A compound of the formula

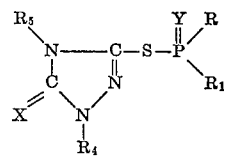

wherein R and $R_1$ can be the same or different and are $C_1$–$C_6$ alkoxy or $C_1$–$C_6$ alkylthio; $R_4$ is $C_1$–$C_6$ alkyl; $R_5$ is $C_1$–$C_6$ alkyl or dimethylamino; X is oxygen or sulfur; and Y is oxygen or sulfur.

3. A compound according to claim 1, O,O-diethyl-S-[(1,4 - dimethyl - 5 - thiono-triazolin-2-yl)-3-thiomethyl] phosphorothioate.

4. A compound according to claim 1, O,O-diethyl-S-[(1,4-dimethyl - 5 - oxo - triazoline - 2 - yl)-3-thiomethyl] phosphorothioate.

5. A compound according to claim 1, O,O-diethyl-S-[(4-dimethylamino - 1 - methyl-5-thiono-triazoline-2-yl)-3-thiomethyl] phosphorothioate.

6. A compound according to claim 1, O-ethyl-S-n-propyl-S'-[(4-dimethylamino - 1 - methyl-5-thiono-triazoline-2-yl)-3-thiomethyl] phosphorodithioate.

7. A compound according to claim 2, O,O-diethyl-S-[3-(4-dimethylamino - 1 - methyl - 5 - thiono-triazoline-2-yl)] phosphorothioate.

TABLE II

[Insecticidal activity of thiophosphate analogs of 3-mercapto-1,2,4-triazol-2-ine-5-(thi)ones]

| | Percent control at 250 p.p.m. | | | | | | | |
|---|---|---|---|---|---|---|---|---|
| | Mexican bean beetle | Southern army worm | Mites contact | | Mites systemic | | Aphid | |
| Compound | | | Adult | Nymph | Adult | Nymph | Contact | Systemic |
| O,O-diethyl-S-[(1,4-dimethyl-5-thiono-triazolin-2-yl)-3-thiomethyl] phosphorothioate | 100 | | 100 | 100 | 100 | 100 | | 100 |
| O,O-diethyl-S-[(1,4-dimethyl-5-oxo-triazolin-2-yl)-3-thiomethyl] phosphorothioate | 100 | | 100 | 90 | 10 | 0 | 90 | 90 |
| O,O-diethyl-S-[(4-dimethylamino-1-methyl-5-thiono-triazolin-2-yl)-3-thiomethyl] phosphorothioate | 100 | 60 | 100 | 80 | 100 | 85 | 100 | 100 |
| O-ethyl-S-n-propyl-S'-[(4-dimethylamino-1-methyl-5-thiono-triazolin-2-yl)-3-thiomethyl] phosphorodithioate | 100 | 100 | 100 | 100 | 80 | 80 | 100 | 40 |
| O,O-diethyl-S-[3-(4-dimethylamino-1-methyl-5-thiono-triazolin-2-yl)] phosphorothioate | 20 | 0 | 80 | 20 | 0 | 0 | 60 | 20 |

Some of the compounds were also tested against other species of Coleoptera family such as confused flour beetle, spider beetle and boll weevil, as well as adult Mexican bean beetles. They were also tested for their effectiveness to control German cockroaches and pea aphids. Tests were also done to determine their ovicidal activity. The test compounds were found active in one or more of these tests.

References Cited
UNITED STATES PATENTS 3,594,390   7/1971   Timmler et al. _____ 260—308 C ALTON D. ROLLINS, Primary Examiner U.S. Cl. X.R.

71—92; 260—552 SC, 554; 424—200